United States Patent
Hill et al.

(10) Patent No.: US 9,968,941 B2
(45) Date of Patent: May 15, 2018

(54) METHOD OF BALL MILLING ALUMINUM METAPHOSPHATE

(71) Applicant: CORNING INCORPORATED, Corning, NY (US)

(72) Inventors: Kimberly Errin Hill, Lindley, NY (US); Martin Joseph Murtagh, Trumansburg, NY (US)

(73) Assignee: CORNING INCORPORATED, Corning, NY (US)

( * ) Notice: Subject to any disclaimer, the term of this patent is extended or adjusted under 35 U.S.C. 154(b) by 532 days.

(21) Appl. No.: 14/723,737

(22) Filed: May 28, 2015

(65) Prior Publication Data
US 2015/0343449 A1 Dec. 3, 2015

Related U.S. Application Data

(60) Provisional application No. 62/005,367, filed on May 30, 2014.

(51) Int. Cl.
*B02C 23/14* (2006.01)
*B02C 17/20* (2006.01)
(Continued)

(52) U.S. Cl.
CPC ............ *B02C 23/14* (2013.01); *B02C 17/10* (2013.01); *B02C 17/185* (2013.01); *B02C 17/20* (2013.01); *B02C 23/08* (2013.01); *C01B 25/44* (2013.01)

(58) Field of Classification Search
CPC ....... B02C 23/14; B02C 17/185; B02C 17/10; B02C 17/20; B02C 23/08; C01B 25/44
(Continued)

(56) References Cited

U.S. PATENT DOCUMENTS

| 2,480,085 A * | 8/1949 | Mitchell | ............ B02C 17/02 209/390 |
| 4,036,721 A * | 7/1977 | Kato | ............ C25D 13/20 204/486 |

(Continued)

FOREIGN PATENT DOCUMENTS

| DE | 67104 | 3/1976 |
| JP | 2001031446 | 2/2001 |

OTHER PUBLICATIONS

U.S. Stoneware: Jar, Ball and Pebble Milling Theory and Practice, Operating Division of ER Advanced Ceramics, Inc.
(Continued)

*Primary Examiner* — Sean Michalski
(74) *Attorney, Agent, or Firm* — Kevin M. Johnson (57) ABSTRACT

A method of preparing an aluminum metaphosphate (ALMP) particulate product includes charging a milling chamber of a ball mill with grinding media and loading an ALMP feedstock into the milling chamber. The ALMP feedstock is milled with the grinding media into ALMP particles at a particle reduction index in a range from 0.25 to 0.5. At a plurality of time steps during a period in which the milling is carried out, a fine fraction of the ALMP particles is removed from the milling chamber while a coarse fraction of the ALMP particles remains in the milling chamber for additional milling. An ALMP particulate product with a particle size distribution having a median particle size in a range from 100 μm to 700 μm is prepared from the ALMP particles removed from the milling chamber.

12 Claims, 5 Drawing Sheets

(51) Int. Cl.
  *B02C 23/08* (2006.01)
  *B02C 17/18* (2006.01)
  *C01B 25/44* (2006.01)
  *B02C 17/10* (2006.01)

(58) Field of Classification Search
  USPC .............................................. 241/24.1, 170
  See application file for complete search history.

(56) References Cited

U.S. PATENT DOCUMENTS

| | | | | |
|---|---|---|---|---|
| 4,274,360 | A * | 6/1981 | Hofmann | B01F 9/08 |
| | | | | 118/303 |
| 4,973,727 | A * | 11/1990 | Gainer | C07F 9/4075 |
| | | | | 556/19 |
| 5,062,601 | A * | 11/1991 | Graf | B02C 17/184 |
| | | | | 241/171 |
| 5,251,826 | A * | 10/1993 | Schonbach | B02C 17/183 |
| | | | | 241/152.2 |
| 5,299,747 | A * | 4/1994 | Satomi | D21B 1/14 |
| | | | | 241/46.17 |
| 5,370,867 | A * | 12/1994 | Okawa | A61K 8/0241 |
| | | | | 424/401 |
| 5,998,528 | A * | 12/1999 | Tsipursky | A61K 8/26 |
| | | | | 523/207 |
| 6,455,451 | B1 * | 9/2002 | Brodkin | A61K 6/033 |
| | | | | 106/35 |
| 6,517,623 | B1 * | 2/2003 | Brodkin | C03B 19/06 |
| | | | | 106/35 |
| 8,703,883 | B2 * | 4/2014 | McDaniel | C08F 210/14 |
| | | | | 241/24.1 |
| 2015/0343449 | A1 * | 12/2015 | Hill | B02C 17/20 |
| | | | | 241/24.1 |

OTHER PUBLICATIONS

Jankovic, A., Dundar H., and Mehta, R., "Relationships Between Comminution Energy and Product Size for a Magnetite Ore," The Journal of the Southern African Institute of Mining and Metallurgy, vol. 110, Mar. 2010, 141-146.

Kwan, Chin Chi, Chen, Yong Qi, Ding, Yu Long, Papadopoulos, Dimitris G., Bentham, Craig A., and Ghadiri Mojtaba, "Development of a Novel Approach Towards Predicting the Milling Behaviour of Pharmaceutical Powders," European Journal of Pharmaceutical Sciences, 23(2004) 327-336.

Bond, Fred C., "Crushing & Grinding Calculations, Part I," British Chemical Engineering, vol. 6, No. 6, Jul. 1961, 378-385.

Bond, Fred C., "Crushing & Grinding Calculations, Part II," British Chemical Engineering, vol. 6, No. 8, Aug. 1961, 543-548.

Hagan, J. T., "Micromechanics of Crack Nucleation During Indentations," Journal of Materials Science 14 (1979) 2975-2980.

PCT/US2015/032900 Search Report dated Sep. 29, 2015.

"Continuous Type Ball Mills"; Aug. 13, 2013; http://web.archive.org/web/20130813081840/http://ballmill.in/ballmill_continuous.html.

"Moulin a billes—Wikipedia"; Apr. 26, 2014; http://fr.wikipedia.org/w/index.php?title=Moulin_%C3%AO_billes&oldid=103232444.

* cited by examiner

METHOD OF BALL MILLING ALUMINUM METAPHOSPHATE

CROSS-REFERENCE TO RELATED APPLICATIONS

This application claims benefit of U.S. Provisional No. 62/005,367 filed on 30 May 2014, the disclosure of which is incorporated herein by reference.

FIELD

The field relates generally to comminution methods and in particular to preparation of a refractory material particulate product with a given particle size distribution.

BACKGROUND

Figure 1:
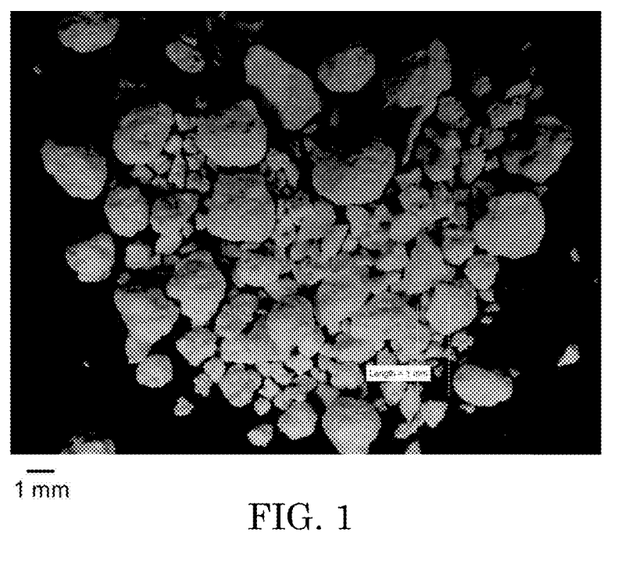
FIG. 1 shows an example particle size of ALMP as calcined.

Aluminum metaphosphate (ALMP), $Al(PO_3)_3$, is produced as a calcined product with an aggregate particle size range of 0.1 mm to greater than 5 mm. FIG. 1 shows an example of ALMP particle sizes as calcined. Once calcined, ALMP is a refractory material with a particle hardness (up to approximately 10 GPa). Prior to use of calcined ALMP in a glass batch, ALMP is subjected to particle size reduction via comminution methods using particle fracture mechanisms such as crushing, impact, and attrition.

Impact milling of ALMP is currently carried out in an abrasive metal cylinder, with rings and/or rotor blades within the cylinder for crushing the particles. However, due to the refractory nature of calcined ALMP, the rings and/or rotor blades get worn out during the milling operation, resulting in metal, primarily iron, contamination in the final ALMP particulate product. For glass production, the iron contamination in the final ALMP particulate product is detrimental to final glass product performance attributes. Magnetic separation is usually used as a post solution step to remove metal contaminants from the milled product.

Figure 2:
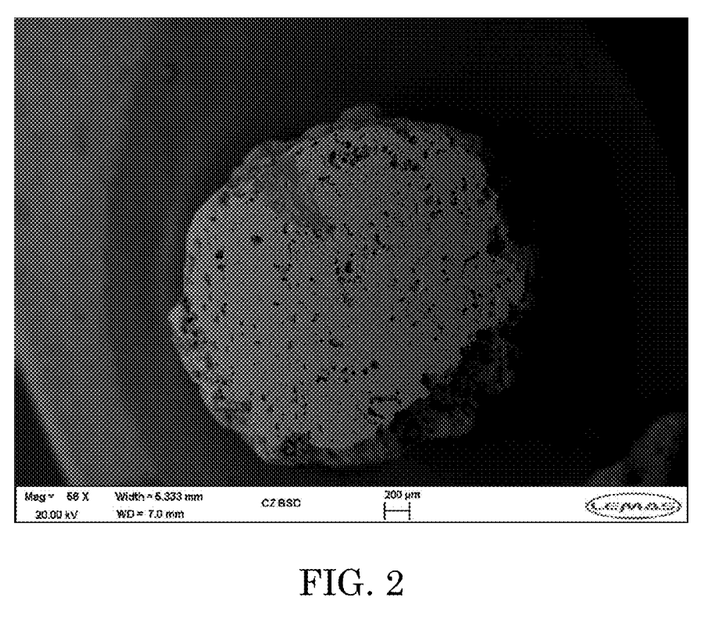
FIG. 2 is a cross sectional SEM image particle of ALMP as calcined.

In addition, as a result of calcining, ALMP aggregates are under varying degrees of compression based on aggregate size. FIG. 2 shows an image particle size of ALMP as calcined. Due to this unique microstructure of ALMP, it is difficult to control the desired final particle size distribution. If the input energy to the impact mill is larger than the aggregate compressive stress, the aggregates will be pulverized, producing an ultra-fine ALMP product that may be unsuitable for some glass batch processes, i.e., the ALMP product may be too fine for ease of conveyance and may aggravate batch dusting.

SUMMARY

In one illustrative embodiment, a method of preparing an ALMP particulate product having a given particle size distribution involves dry milling an ALMP feedstock in a ball mill using grinding media made of ceramic material. At various time steps during the milling, a fine fraction of ALMP particles is removed from the ball mill, while leaving a coarse fraction of the ALMP particles in the ball mill for continued milling. The ALMP particulate product having the given particle size distribution is prepared from the ALMP particles removed from the ball mill.

It is to be understood that both the foregoing general description and the following detailed description are exemplary of the invention and are intended to provide an overview or framework for understanding the nature and character of the invention as it is claimed. The accompanying drawings are included to provide a further understanding of the invention and are incorporated in and constitute a part of this specification. The drawings illustrate various embodiments of the invention and together with the description serve to explain the principles and operation of the invention.

BRIEF DESCRIPTION OF THE DRAWINGS

The following is a description of the figures in the accompanying drawings. The figures are not necessarily to scale, and certain features and certain views of the figures may be shown exaggerated in scale or in schematic in the interest of clarity and conciseness.

DETAILED DESCRIPTION

A method of producing an aluminum metaphosphate (ALMP) particulate product with a given particle size distribution is described herein. In one embodiment, the given particle size distribution comprises particles having a median particle size ($d_{50}$) in a range from 100 μm to 700 μm. In another embodiment, the given particle size distribution comprises particles having a median particle size greater than 100 μm.

In one embodiment, a method of producing an ALMP particulate product with a given particle size distribution includes loading dry ALMP feedstock into a ball mill and operating the ball mill to mill the ALMP feedstock into ALMP particles having a median particle size that is reduced in comparison to that of the ALMP feedstock, wherein at various time steps during the milling a fine fraction of ALMP particles is removed from the ball mill. This ball milling with removal of fine fraction of ALMP particles at various time steps has been found to have a higher milling efficiency compared to ball milling in a continuous presence of fine fraction of ALMP particles. What is considered to be fine fraction will depend on the desired particle size distribution. In one embodiment, the fine fraction may include particle sizes in a range from 100 μm to 700 μm. In yet another embodiment, the fine fraction may include particle sizes in a range from 212 μm to 425 μm.

Table A1 shows particle characterization for ALMP particulate product samples I and II. Sample I was produced with removal of fine fraction at various time steps during milling, as described in this disclosure. Sample II was produced without removal of fine fraction during milling and is shown in Table A1 for comparative purposes. In particle size distribution terminology, the parameter $d_{50}$ is the maximum particle diameter below which 50% of the sample volume exists (also known as the median particle size by volume). The parameter $d_{10}$ is the maximum particle diameter below which 10% of the sample volume exists. The parameter $d_{90}$ is the maximum particle diameter below which 90% of the sample volume exists.

TABLE A1

| Sample | $d_{10}$ | $d_{50}$ | $d_{90}$ | Breadth of distribution | alpha | beta |
|---|---|---|---|---|---|---|
| I | 12.1 | 240.0 | 352.0 | 1.42 | 142.4 | 2.0 |
| II (Comparative) | 13.8 | 120.0 | 328.0 | 2.62 | 167.5 | 2.8 |

Figure 3A:
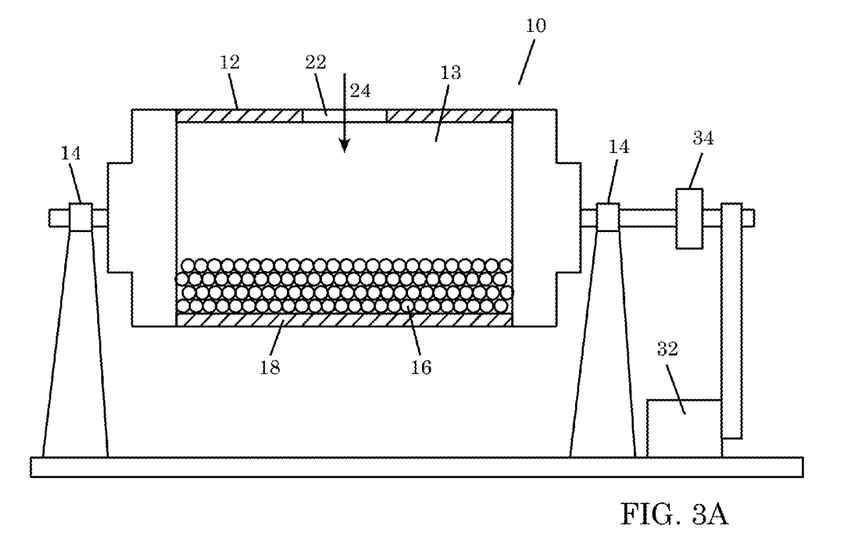
FIGS. 3A-3C show an example of a ball mill.

FIG. 3A shows an example of a ball mill 10 including a hollow cylindrical shell 12 supported for rotation about its axial axis by bearings 14. (In some ball mill designs, the shell 12 may be supported on rollers.) The shell 12 has an inner liner 18 made of an abrasion-resistant material. The shell 12 provides a milling chamber 13, which is partially filled with grinding media 16. The grinding media 16 is made up of balls, which may be in the form of spheres or cylinders or other mass shapes.

Figure 3B:
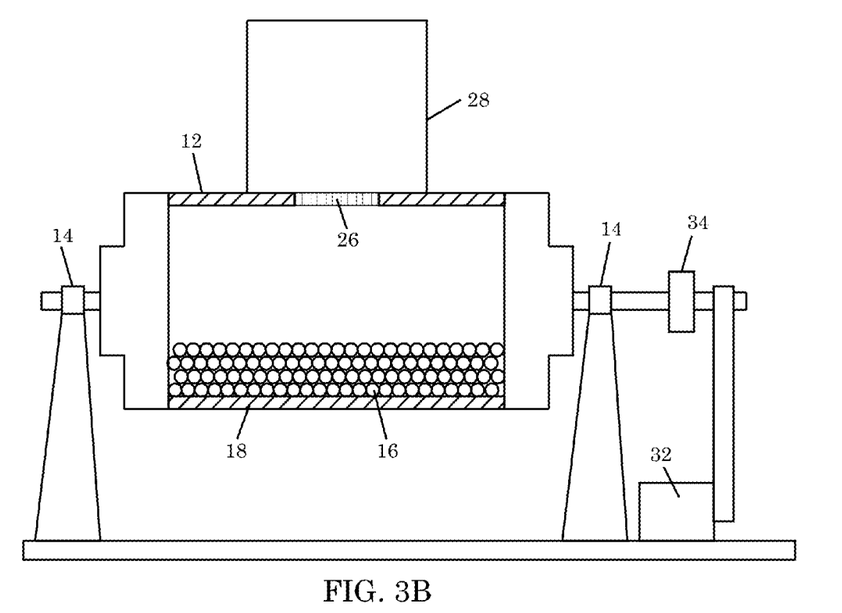

Feed material may be introduced into the milling chamber 13 through an opening 22 in the shell 12, as shown by arrow 24. The same opening 22 may be used to discharge milled material out of the milling chamber 13. As shown in FIG. 3B, a discharge grating 26 may be mounted in the opening 22 while discharging milled material out of the milling chamber 13. The discharge grating 26 will have various slots and holes to control the sizes of particles removed from the milling chamber 13 through the opening 22. A discharge housing 28 may also be provided to collect the milled particles removed from the milling chamber 13. (In some ball mill designs, separate inlet and outlet ports for feed material and milled material, respectively, may be provided.)

To avoid metal contamination of the final ALMP particulate product produced by the ball mill 10, the grinding media 16 and inner liner 18 may be made of non-metallic material. In one embodiment, the grinding media 16 and inner liner 18 are made of ceramic materials, e.g., aluminum-based ceramic materials such as alumina. A ball mill having grinding media and inner liner made of a ceramic material may be described as a ceramic ball mill.

Figure 3C:
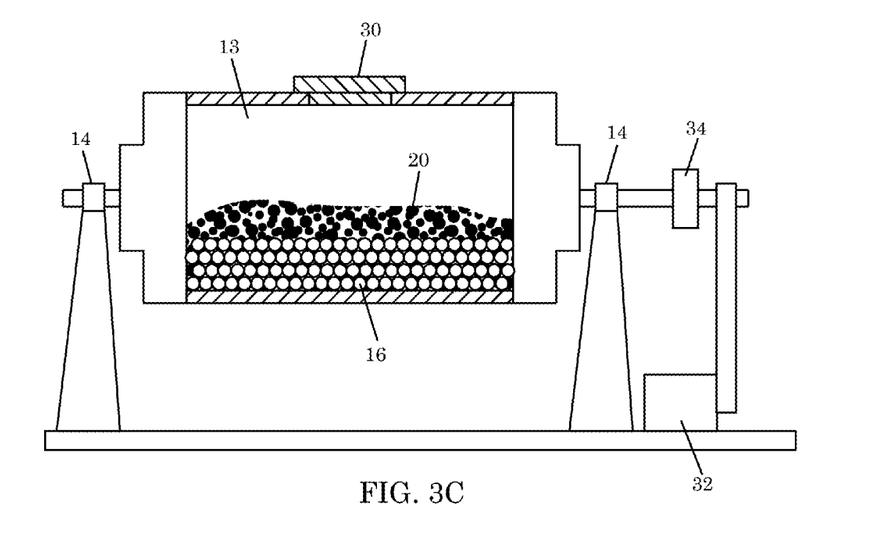

To execute the method described above, ALMP feedstock (20 in FIG. 3C) is fed into the milling chamber 13, which is already charged with grinding media 16. In one embodiment, 20% to 30% of the total volume of the milling chamber 13 may be filled with the ALMP feed stock, and 45 to 50% of the total volume of the milling chamber 13 may be filled with grinding media 16. The ALMP feedstock in one embodiment comprises an aggregate particle size in a range from 0.1 mm to approximately 5 mm. The milling chamber 13 is closed, e.g., by mounting a cover (30 in FIG. 3C) in the opening 22. The ball mill 10 is operated by rotating the milling chamber 13 or shell 12 using a drive motor 32 and gear box 34. With careful selection of the rotational speed of the mill, the balls (grinding media 16) will cascade through the milling chamber 13, colliding with the ALMP particles, resulting in grinding and/or crushing of the ALMP particles. The speed at which the mill acts as a centrifuge is known as the critical speed. In general, it is preferred that the mill does not act as a centrifuge since the balls will not be able to effectively impart the desired milling action on the ALMP particles. The rotational speed should be selected to be below the critical speed. In one embodiment, the rotational speed is selected to be about 65% of the critical speed.

According to the method described above, at various time steps, a fine fraction of ALMP particles is removed from the milling chamber 13. This may involve pausing rotation of the milling chamber 13, installing the discharge grating (26 in FIG. 3B), and removing the desired fine fraction. The number of time steps and interval between time steps can be determined empirically but would generally depend on the material properties and particle reduction index.

Figure 3D:
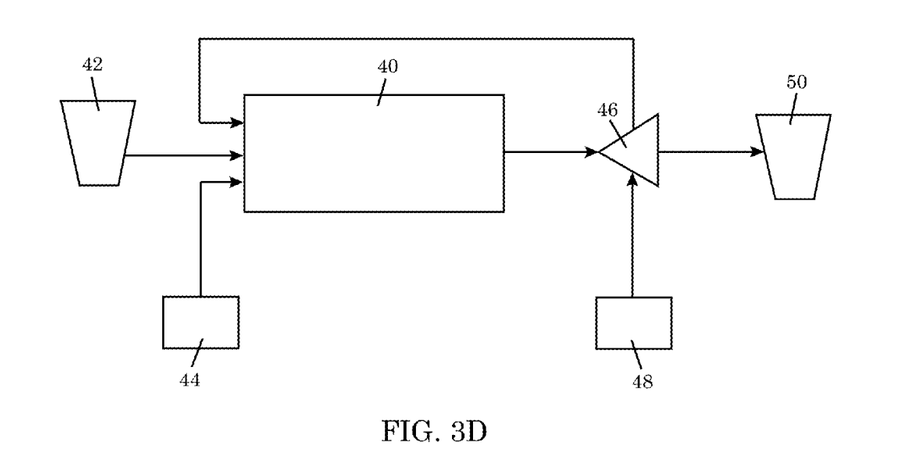
FIG. 3D shows an air swept ball mill process.

In alternate embodiments, the ball mill can be designed such that the fine fraction can be removed at various time steps without interrupting the operation of the ball mill. For example, in the setup shown in FIG. 3D, an input end of an air-swept milling chamber 40 is connected to a feeder 42 and an air source 44. (The milling chamber 40 can be lined with the material as described for the milling chamber 13 above.) The feeder 42 will provide the milling chamber 40 with ALMP feedstock, and the air source 44 will provide the milling chamber 40 with air at a predetermined flow rate. The air will be provided to the milling chamber 40 at the various time steps mentioned above to sweep particles out of the milling chamber 40 without having to interrupt operation of the milling chamber 40. The swept particles are received in an air classifier 46, which is connected to an air source 48. Particles meeting the specification of fine fraction will be swept from the air classifier 46 into a product collector 50. The remaining coarse particles can be returned to the milling chamber 40.

The efficiency of a milling process can be quantified by a particle size reduction index, input energy to the mill, work required to mill the particles, and milling work index. These parameters are described below.

Particle size reduction index is a dimensionless value indicating the degree to which the particle size of the feed material is reduced by milling at time t. In other words, particle size reduction index compares the particle size of the milled product at time t to the feed material. Particle size reduction index can be determined from Equation (1A).

$$D(I) = \frac{d_t - d_L}{d_0 - d_L} \quad (1A)$$

In Equation (1A), D(I) is particle size reduction index, $d_t$ is $d_{50}$ of the mill sample at time t, $d_L$ is terminal milled particle size (i.e., $d_{50}$ at the milling limit of the sample where no further nucleation of particle fractures is possible even with further milling), $d_0$ is $d_{50}$ of the feed material, and $d_{50}$ is median particle size. (See, Kwan et al., "Development of a novel approach towards predicting the milling behavior of pharmaceutical powders," European Journal of Pharmaceutical Sciences 23 (2004) 327-336.)

The terminal milled particle size, $d_L$, of Equation (1A) can be determined from Equation (1B) below.

$$d_L = 29.5 \left( \frac{K_{1C}}{H} \right)^2 \quad (1B)$$

In Equation (1B) above, $K_{1C}$ is average particle fracture toughness and H is average particle hardness. (See, J. T.

Hagan, "Micromechanics of Crack Nucleation During Indentations," Journal of Materials Science 14 (1979) 2975-2980.)

The work required to mill the particles, based on Bond's theory, can be determined from Equation (2A) below.

$$W = W_i \left( \frac{10}{\sqrt{P_{80}}} - \frac{10}{\sqrt{F_{80}}} \right) \quad (2A)$$

In Equation (2A) above, W is the work input (kWh/ton), $W_i$ is grindability work index (kWh/ton), which expresses the resistance of the material to crushing and grinding, $F_{80}$ is 80% passing size of the product (μm), and $P_{80}$ is 80% passing size of the feed (μm). (See, Jankovic et al., "Relationships between comminution energy and product size for a magnetite ore, The Journal of The Southern African Institute of Mining and Metallurgy, Vol. 110, March 2010.)

The grindability work index, $W_i$, of Equation (2A) is given by Equation (2B) below.

$$W = \frac{49}{P^{0.23} G_{bP}^{0.82} \left( \frac{10}{\sqrt{P_{80}}} - \frac{10}{\sqrt{F_{80}}} \right)} \quad (2B)$$

In Equation (2B) above, P is closing sieve size (μm), $G_{bp}$ is the grindability (acceleration of gravity per revolutions (rpm) of the ball mill in reciprocal time), $F_{80}$ is the 80% passing size of the product (μm), and $P_{80}$ is the 80% passing size of the feed.

EXAMPLE 1

An ALMP feedstock (aggregate particle size range of 0.1 mm to 5.0 mm) having the average particle mechanical properties shown in Table 1 were provided.

TABLE 1

| Average Particle Mechanical Properties | Aluminum Metaphosphate (ALMP) |
|---|---|
| Elastic Modulus (GPa) | 100 |
| Hardness (GPa) | 3.6 |
| Fracture Toughness (MPa · m$^{1/2}$) | 3.8 |

EXAMPLE 2

Samples of the ALMP feedstock from Example 1 were ball milled in a U.S. Stoneware Roalox Alumina-Fortified Grinding Jar, available from E.R. Advanced Ceramics, Inc., with a 45% by volume charge of cylindrical alumina grinding media. The sizes of the grinding media were 0.5 inches (outer diameter) by 0.5 inches (length) and 1.25 inches (outer diameter) by 1.25 inches (length). The grinding jar had a height of 8.5 inches and a diameter of 8.875 inches. The apparent input energy for operating the mill was in a range from 1.00 to 1.25 kWh/ton. The ball milling involved removal of fine fraction at various time steps during the milling process. Table 2 shows the results of the ball milling according to this example.

TABLE 2

| Sample | 1 | 2 | 3 | 4 | 5 | 6 | 7 |
|---|---|---|---|---|---|---|---|
| Time (min) | 15 | 30 | 45 | 60 | 75 | 90 | 105 |
| Feed $d_0$ (μm) | 1500 | 1500 | 1500 | 1500 | 1500 | 1500 | 1500 |
| Terminal $d_L$ (μm) | 30.0 | 30.0 | 30.0 | 30.0 | 30.0 | 30.0 | 30.0 |
| Product $d_t$ (μm) | 950 | 825 | 700 | 630 | 420 | 380 | 240 |
| Reduction Index | 0.63 | 0.54 | 0.46 | 0.37 | 0.27 | 0.24 | 0.14 |
| Feed $d_{80}$ (μm) | 2600 | 2600 | 2600 | 2600 | 2600 | 2600 | 2600 |
| Product $d_{80}$ (μm) | 1360 | 1240 | 1140 | 1030 | 815 | 610 | 410 |
| $P_{0.23}$ (μm) | 5.30 | 5.30 | 5.10 | 5.10 | 4.71 | 4.52 | 3.86 |
| $W_i$ (kWh/ton) | 12.2 | 10.4 | 9.5 | 8.2 | 6.7 | 5.1 | 4.2 |

EXAMPLE 3 (COMPARATIVE)

Samples of ALMP feedstock from Example 1 were balled milled in a U.S. Stoneware Roalox Alumina-Fortified Grinding Jar, available from E.R. Advanced Ceramics, Inc., with a 45% charge of cylindrical alumina grinding media. The sizes of the grinding media were 0.5 inches (outer diameter) by 0.5 inches (length) and 1.25 inches (outer diameter) by 1.25 inches (length). The grinding jar had a height of 8.5 inches and a diameter of 8.875 inches. The apparent input energy for operating the mill was in a range from 1.00 to 1.25 kWh/ton. The ball milling did not involve any removal of fine fraction during the milling process, which means that the milling occurred in a continuous presence of fine fraction. Table 3 shows the results of the ball milling according to this comparative example.

TABLE 3

| Sample | 9 | 10 | 11 | 12 | 13 | 14 |
|---|---|---|---|---|---|---|
| Time (min) | 60 | 105 | 120 | 135 | 150 | 165 |
| Feed $d_0$ (μm) | 1160 | 1160 | 1160 | 1160 | 1160 | 1160 |
| Terminal $d_L$ (μm) | 30.0 | 30.0 | 30.0 | 30.0 | 30.0 | 30.0 |
| Product $d_t$ (μm) | 548 | 360 | 260 | 210 | 150 | 120 |
| Reduction Index | 0.46 | 0.29 | 0.20 | 0.16 | 0.11 | 0.08 |
| Feed $d_{80}$ (μm) | 1775 | 1775 | 1775 | 1775 | 1775 | 1775 |
| Product $d_{80}$ (μm) | 990 | 825 | 631 | 562 | 380 | 310 |

TABLE 3-continued

| Sample | 9 | 10 | 11 | 12 | 13 | 14 |
|---|---|---|---|---|---|---|
| $P_{0.23}$ (μm) | 4.90 | 4.71 | 4.52 | 4.35 | 4.01 | 3.86 |
| $W_i$ (kWh/ton) | 12.3 | 9.3 | 6.7 | 6.0 | 4.4 | 3.8 |

The improvement in milling efficiency with the ball milling involving removal of fine fraction at various time steps (Example 2) over the ball milling not involving removal of fine fraction (Example 3) can be observed by comparing the results shown in Tables 2 and 3. For example, for a particle size reduction index (see Equation (1A) above) of 0.46, the milling time for Example 2 (ball milling with removal of fine fraction) was 45 minutes (Table 2), and the milling time for Example 3 (ball milling without removal of fine fraction) was 60 minutes (Table 3).

Figure 4:
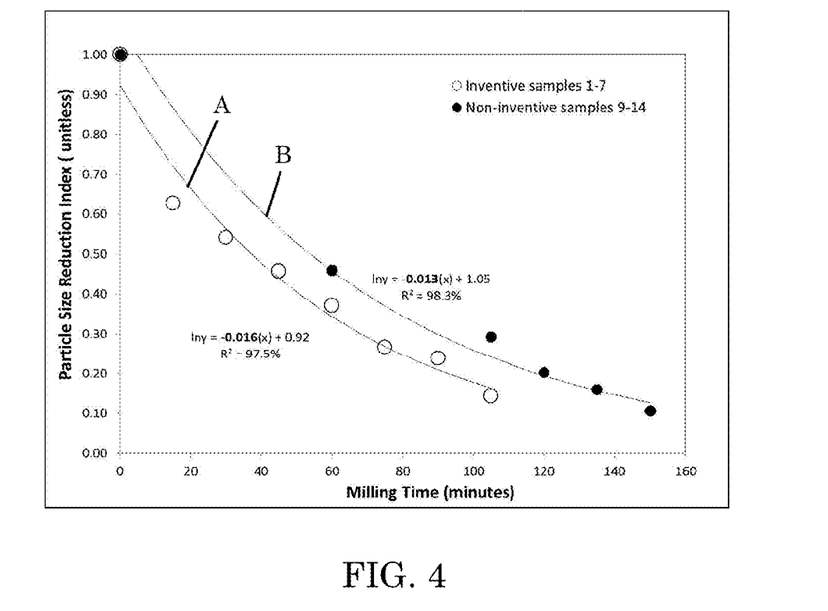
FIG. 4 shows particle reduction index as a function of milling time for samples according to one embodiment and samples according to a comparative example.

FIG. 4 shows particle size reduction index as a function of milling time curves A and B. Curve A is based on the data of Table 2 (i.e., the data for ball milling with timed intermediate removal of fine fraction; the data points are shown by the solid white circles), and curve B is based on the data of Table 3 (i.e., the data for ball milling without any intermediate removal of fine fraction; the data points are shown by the solid black circles). For any particle reduction index, the milling time on curve A will be lower than the milling time on curve B, which means that less milling time is required to achieve a particular particle reduction index with ball milling with removal of fine fraction at various steps (curve A) compared to ball milling without any removal of fine fraction (curve B). FIG. 4 illustrates a milling time increase of 21% for the samples of Table 3 (curve B) compared to the samples of Table 2 (curve A).

Figure 5:
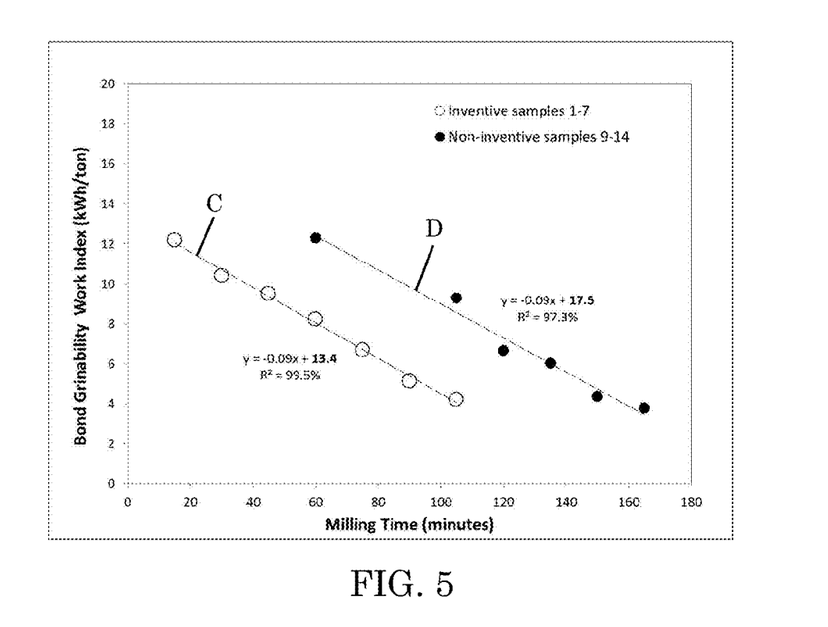
FIG. 5 shows Bond milling work index as a function of milling time for samples according to one embodiment and samples according to a comparative example.

FIG. 5 shows Bond grindability work index as a function of milling time lines C and D. Line C is based on the data of Table 2 (the data points are shown by the solid white circles), and line D is based on the data of Table 3 (the data points are shown by the solid black circles). For any milling time, the Bond grindability work index on line C will be lower than the Bond grindability work index on line D, which means that less work is required to achieve a particular milling time with ball milling with removal of fine fraction at various steps (line C) compared to ball milling without any removal of fine fraction (line D). In order to arrive at the same particle reduction index for both milling methods, a four-fold increase in milling time would be needed for ball milling without any removal of fine fraction compared to ball milling with removal of fine fraction at various time steps.

Figure 6:
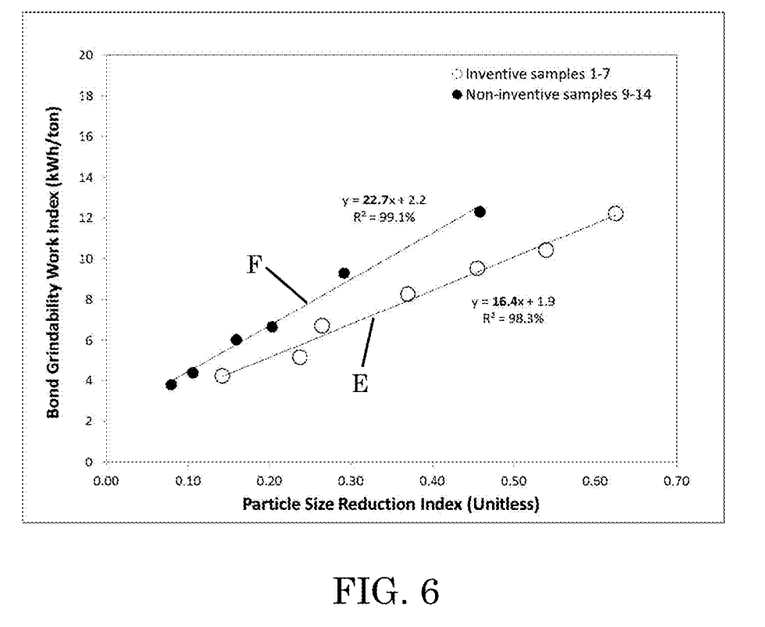
FIG. 6 shows particle reduction index as a function of Bond milling work index for samples according to one embodiment and samples according to a comparative example.

FIG. 6 shows Bond grindability work index as a function of particle size reduction index lines E and F. Line E is based on the data of Table 2 (the data points are shown by the solid white circles), and line F is based on the data of Table 3 (the data points are shown by the solid black circles). In general, for any particle reduction index, Bond grindability work index on line E is lower than Bond grindability work index on line F, which means that less work is required to achieve a particular particle reduction index with ball milling with removal of fine fraction at various steps (line E) compared to ball milling without any removal of fine fraction (line F). FIG. 6 shows a 38% increase in the amount of work (energy) per ton as a function of particle size reduction index for the samples milled without any removal of fine fraction (line F, Table 3) compared to the samples milled with removal of fine fraction at various time steps (line E, Table 2).

As demonstrated in FIGS. 4-6, milling ALMP in the presence of a continuous fine fraction results in a higher milling work per ton. To reduce the work input, prevent over-milling of the particles, and improve the overall efficiency of the milling process, removal of fine fraction at various time steps can be applied to the milling process. The particle sizes of the fine fraction will depend on the desired final particle size distribution.

Figure 7:
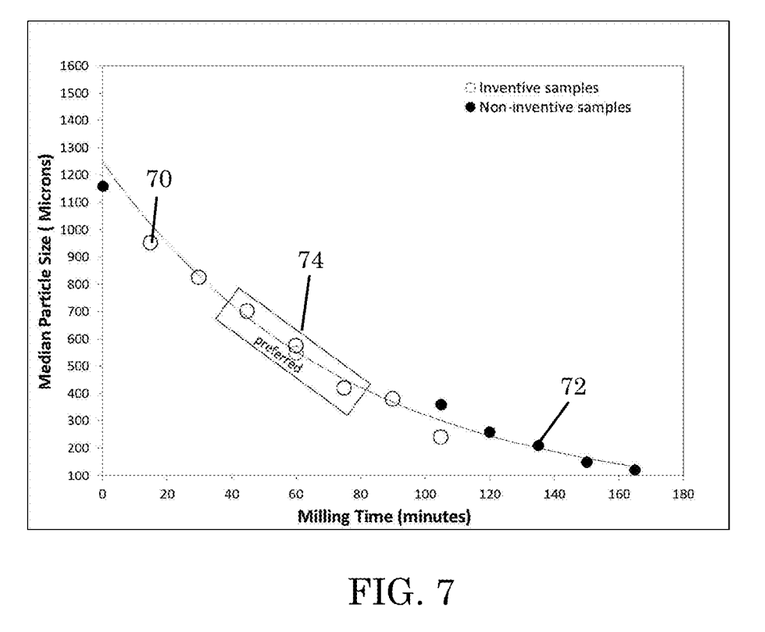
FIG. 7 shows median particle size as a function of milling time for samples according to one embodiment and samples according to a comparative example.

FIG. 7 shows median particle size as a function of milling time for the samples milled in Examples 2 and 3. The solid white circles 70 represent the samples of Example 2, while the solid black circles 72 represent the samples of Example 3. Example 2 produces particle size distributions with median particle sizes in a given range of 400 to 700 μm, according to one embodiment. Based on the results of FIGS. 4-6, particle size distributions with median particle sizes in a range of 400 to 700 μm can be achieved by ball milling with removal of fine fraction at various steps according to the following parameters: input specific energy to minimize over-milling in a range of 0.5 to 2 kWh/ton, work of milling in a range from 6 to 8 kWh/ton, milling media having a size 10 to 15 times larger than the largest particles in the ALMP feedstock, and particle size reduction index in a range from 0.25 to 0.5.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

The invention claimed is:

1. A method of preparing an aluminum metaphosphate particulate product, comprising:
   charging a milling chamber of a ball mill with grinding media;
   loading an aluminum metaphosphate feedstock into the milling chamber;
   milling the aluminum metaphosphate feedstock with the grinding media into aluminum metaphosphate particles at a particle reduction index in a range from 0.25 to 0.5;
   at a plurality of time steps during a period in which the milling is carried out, removing a fine fraction of the aluminum metaphosphate particles from the milling chamber while leaving a coarse fraction of the aluminum metaphosphate particles in the milling chamber for additional milling; and
   preparing an aluminum metaphosphate particulate product with a particle size distribution having a median particle size in a range from 100 μm to 700 μm from the aluminum metaphosphate particles removed from the milling chamber.

2. The method of claim 1, wherein charging the milling chamber with grinding media comprises selecting grinding media made of a ceramic material.

3. The method of claim 2, wherein selecting grinding media made of a ceramic material comprises selecting grinding media made of alumina.

4. The method of claim 2, wherein charging the milling chamber comprises selecting a milling chamber lined with a ceramic material.

5. The method of claim 4, wherein selecting a milling chamber lined with a ceramic material comprises selecting a milling chamber lined with alumina.

6. The method of claim 1, wherein the fine fraction of aluminum metaphosphate particles comprises particle sizes in a range from 100 μm to 700 μm.

7. The method of claim 1, wherein the aluminum metaphosphate particulate product has a particle size distribution with a median particle size of greater than 100 μm.

8. The method of claim 1, wherein the aluminum metaphosphate feedstock has an aggregate particle size range of 0.1 mm to 5.0 mm.

9. The method of claim 1, wherein the fine fraction is removed at the plurality of time steps without pausing the milling of the aluminum metaphosphate feedstock.

10. The method of claim 1, wherein the particle size distribution of the aluminum metaphosphate particulate product has a median particle size in a range from 400 μm to 700 μm.

11. The method of claim 10, wherein the grinding media comprises a plurality of individual balls, each ball having a size 10 to 15 times larger than the largest particle in the aluminum metaphosphate feedstock.

12. The method of claim 10, wherein an input specific energy to the ball mill during the milling is in a range from 0.5 to 2 kWh/ton.

* * * * *

UNITED STATES PATENT AND TRADEMARK OFFICE
CERTIFICATE OF CORRECTION

PATENT NO. : 9,968,941 B2
APPLICATION NO. : 14/723737
DATED : May 15, 2018
INVENTOR(S) : Kimberly Errin Hill et al.

Page 1 of 1

It is certified that error appears in the above-identified patent and that said Letters Patent is hereby corrected as shown below:

On page 2, Column 2, item (56), other publications, Line 5, delete "Chin Chi," and insert -- Chih Chi, --, therefor.

Signed and Sealed this
Twenty-first Day of July, 2020

Andrei Iancu
*Director of the United States Patent and Trademark Office*